United States Patent [19]

Neki et al.

[11] Patent Number: 4,602,581
[45] Date of Patent: Jul. 29, 1986

[54] SEWING MACHINE CONTROLLING APPARATUS

[75] Inventors: Shigeo Neki, Osaka; Nozomu Shinozaki; Takeshi Morofuji, both of Hirakata, all of Japan

[73] Assignee: Matsushita Electric Industrial Co., Ltd., Osaka, Japan

[21] Appl. No.: 710,303

[22] Filed: Mar. 8, 1985

Related U.S. Application Data

[62] Division of Ser. No. 479,978, Mar. 29, 1983, Pat. No. 4,556,001.

[30] Foreign Application Priority Data

Apr. 2, 1982 [JP] Japan ................................ 57-55804
Apr. 2, 1982 [JP] Japan ................................ 57-55805

[51] Int. Cl.$^4$ ............................................. D05B 69/18
[52] U.S. Cl. .................................................. 112/277
[58] Field of Search ............... 112/277, 275, 220, 221, 112/121.11, 262.1; 318/315, 318, 313, 341, 327, 561

[56] References Cited

U.S. PATENT DOCUMENTS 4,473,020  9/1984  Neki et al. ........................... 112/277
4,490,656  12/1984  Arnold .............................. 112/277 X Primary Examiner—Peter Nerbun
Attorney, Agent, or Firm—Wenderoth, Lind & Ponack

[57] ABSTRACT

A sewing machine controlling apparatus which starts and stops a sewing machine or controls its speed in accordance with the position of an adjusting means, e.g. - control pedal, for setting a sewing machine speed. The sewing machine speed, as controlled by the controlling apparatus is independent of the influences caused by changes in the pedal position signal $P_A$ through the vibrations of the machine or through the variations in a power-supply voltage. A smooth speed switching operation, which is free from speed variations, can be realized even at a stepped switching point of the machine speed control pedal.

2 Claims, 7 Drawing Figures

SEWING MACHINE CONTROLLING APPARATUS

This application is a division of application Ser. No. 479,978, filed 3-29-83, now U.S. Pat. No. 4,556,001.

BACKGROUND OF THE INVENTION

The present invention relates to a sewing machine controlling apparatus, which starts and stops a sewing machine or controls its variable speed in accordance with the position of an adjusting means for setting a sewing machine speed.

Conventionally, a system was mainly adopted of converting the position of the adjusting means of a sewing machine controlling apparatus into analog signals so as to make the analog signals into speed setting signals, and composing the speed controlling portion of analog operation around an $\overline{OP}$ amplitude circuit.

However, in recent years the development in digital IC's, etc., with microcomputers as central components is conspicuous. The speed controls have been gradually digitized for improvements in terms of cost or reliability. Thus, the detection signals of the adjusting means are naturally required to be digitized. When the pedal of the sewing machine is used as the adjusting means, various systems are used to detect and generate digital signals corresponding to the movement thereof.

However, some digital systems, which are common among the various systems, have a fatal disadvantage in that a boundary exists where the signal changes without fail; the changes are caused between two adjacent signal values due to the variations of the sewing machine, when the pedal has been positioned on the condition of the boundary, so as to considerably vary the speed of the sewing machine, and thus making it impossible to be put into practical use.

SUMMARY OF THE INVENTION

Accordingly, an object of the present invention is to provide an improved sewing-machine controlling apparatus in which the speed setting can be smoothly switched in accordance with the position of the adjusting means, thus ensuring the stable speed operation, which is independent of the sewing-machine vibrations.

According to the present invention, a sewing machine controlling apparatus is provided so as to comprise an adjusting means for setting machine speed, a set position detecting means for converting the position of the adjusting means into a digital set position signal $P_D$, a speed converting means for converting said set position signal into a speed setting signal S, a motor, whose speed is controlled in a step by step fashion in accordance with said speed setting signal S, a machine which is driven by the motor, a controlling means for controlling the machine, a timer which performs a presetting operation, wherein the shifting conditions from a speed setting signal $S_1$ in accordance with an optional set position signal $P_{D1}$ to a speed setting signal $S_2$ in accordance with an optional set position signal $P_{D2}$ are restricted only to a case where said set position signal $P_{D2}$ has been maintained during a time T preset into said timer.

The object and other objects, features, aspects and advantages of the present invention become more apparent from the following detailed description of the present invention when taken in conjunction with the accompanying drawings.

DETAILED DESCRIPTION OF THE INVENTION

Figure 1:
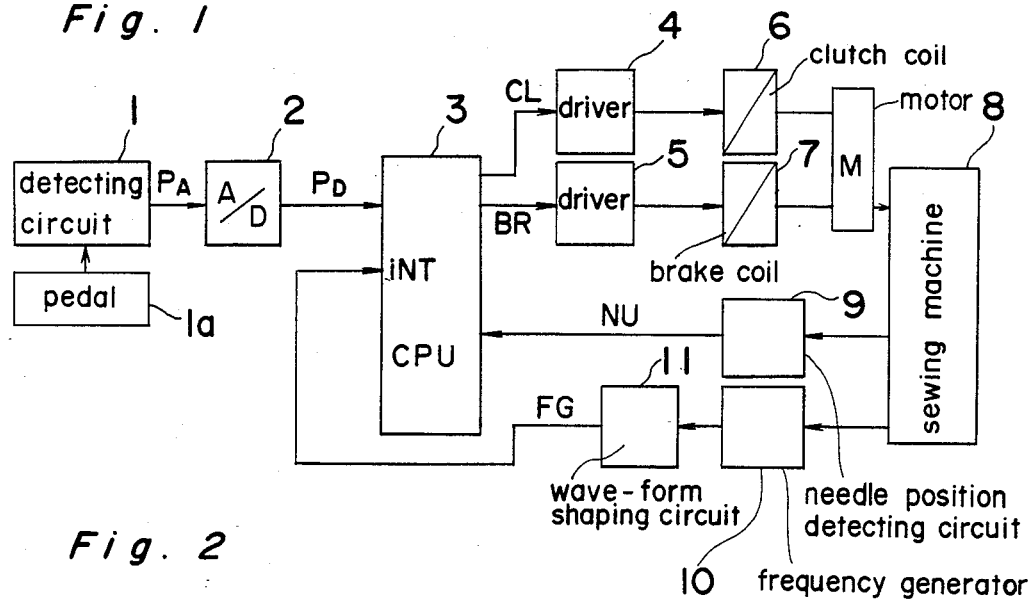
FIG. 1 is a block diagram of a sewing machine controlling apparatus according to the present invention.

Referring to FIG. 1, a pedal-position detecting circuit 1 is connected to a microcomputer 3 through an A/D converter 2.

The circuit 1 converts the stepping amount from the reference position of a treadle pedal a provided in association with a sewing machine 8 into electric signals. For example, the reciprocating operation of the pedal is converted into a revolving action. A magnet is disposed at the central portion of the pedal for operative cooperation, and a means is used for detecting the rotary angle of the magnet by employing a magnetic reluctance element. Thus, an output signal $P_A$ is outputted from the circuit 1 as an analog signal. The A/D converter 2 converts the analog signal $P_A$ of the circuit 1 into a digital signal $P_D$ of 4 bits which is input into the microcomputer 3. The microcomputer 3 is connected to the sewing machine 8 through a pair of drivers 4 and 5 and coils 6 and 7 which to constitute a means for controlling the sewing machine 8 in a central portion of the machine control. The drivers receive the outputs from the microcomputer 3 so as to drive the clutch coil 6 and the brake coil 7. A motor M is provided in association with the sewing machine 8 as a so-called electromagnetic coupling construction wherein the motor transmits the turning effort of a motor main-body, which is always rotating at a high speed, to an output shaft through the magnetic circuit due to the excitation of the clutch coil 6; the motor changes the sliding speed with respect to the rotary portion of the motor main-body by the intensity of the exciting current so as to thereby perform the speed controlling operation, and the motor stops the output shaft through the magnetic circuit due to the excitation of the brake coil 7. The sewing machine 8 is normally coupled to the output shaft of the motor through a pulley and a belt. A needle position detecting circuit 9 is provided between the microcomputer 3 and the sewing machine 8, and is adapted to adjust a magnet piece, engaged with the shaft end of the sewing machine 8, in accordance with the needle-above position to rotate it in synchronous relationship with respect to the rotation of the machine shaft. The needle-above position is detected, by a hall effect IC which is provided in association with the circuit 9 and which is disposed in a stationary position opposite to the magnet piece so as to output a needle-above signal NU. A frequency generator 10 is connected between the microcomputer 3 and the sewing machine 8 together with a wave-form shaping circuit 11 and is normally engaged with the machine shaft end so as to output signals which have a period which is to be varied in accordance with the rotational speed of the sewing machine. The waveform shaping circuit 11 is composed of a circuit having a comparator used for shaping the signals which are to be outputted from the frequency generator into rectangular-wave pulse signals FG. The pulse signals FG of the circuit 11 are inputted into the terminal iNT of the microcomputer 3.

The operation of the above-described apparatus will be described hereinafter.

Once the pedal is stepped on by the operator so as to move it from its reference position, the amount of motion is detected by the pedal-position detecting circuit 1 so as to thereby output an analog signal $P_A$. The analog signal $P_A$ is converted into a set position signal $P_D$, which is a digital value of 4 bits, by the A/D converter 2.

The microcomputer 3 converts the set position signal $P_D$, if the value of the set position signal $P_D$ is a normal value or more, into numerical value, i.e., speed setting signals S, causing the frequency-division of the pulse signal FG by a ROM table to be described later; a frequency-division value is stored in a RAM (RAM1); a signal CL excites a clutch coil 6 through the driver 4 so as to thereby drive the sewing machine 8.

After operating the sewing machine 8 as described hereinabove, the pulse signals FG are outputted into the input terminal iNT of the microcomputer 3 through the frequency generator 10 and the wave-form shaping circuit 11. The microcomputer 3 divides the input in frequency by the number stored in the above-described RAM1, and measures the frequency-divided period, and effects an assignment operation in an operation formula to be described later so as to control the exciting time of the clutch brake of the section of the following pulse signal FG. The speed controlling operation for the sewing machine 8 is performed while the measurement and controlling operations within the microcomputer 3 are being repeated. Accordingly, the sewing machine 8 is operated at a speed in accordance with the analog signal $P_A$ outputted through the detection by the pedal-position detecting circuit 1.

Then, when the pedal is returned towards the reference position and the set position signal $P_D$ becomes smaller than the normal value, a low speed is set and the brake coil 7 is excited through the driver 5 so that the sewing machine 8 is rapidly reduced in speed to the low speed. When the sewing machine 8 becomes slower in speed, the clutch coil 6 is turned off at a time point when the needle-above signal Nu from the needle-position detecting circuit 9 has been outputted so as to excite the brake coil 7 for a given time so that the machine 8 comes to a stop in the needle-above position.

Thus, the series of operations of finishing a needlework, replacing it by the new needlework, and starting to sew it are adapted to be effected. The first embodiment of the present invention will be described in detail hereinafter with reference to the drawings of FIG. 2 and the subsequent descriptions.

Figure 2:
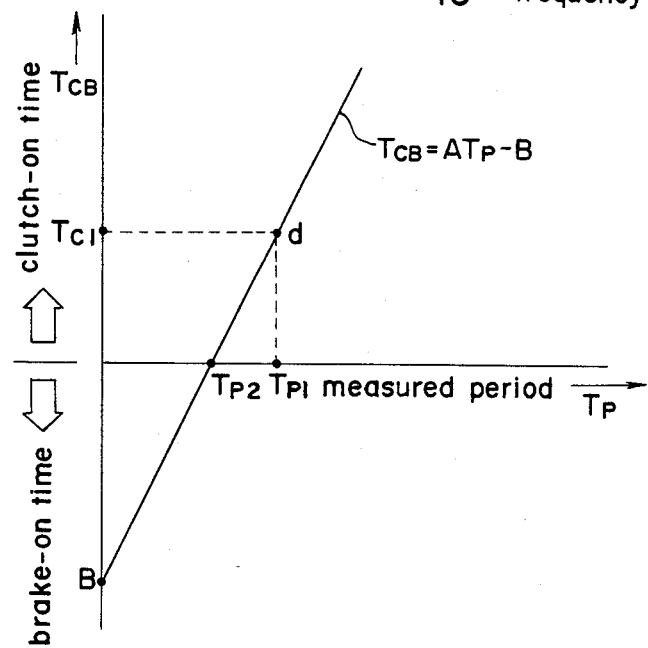
FIG. 2 is a chart for illustrating the principle of speed control for the sewing machine.
Figure 3:
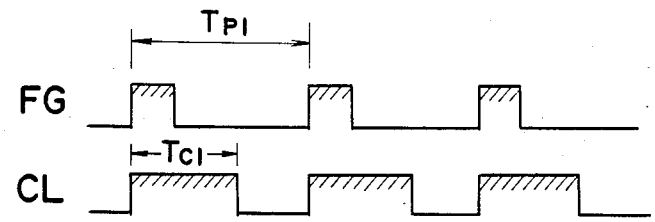
FIG. 3 is a time chart showing the low-speed operating condition.

FIG. 2 and FIG. 3, which are charts showing the principles of controlling the speed, will be described hereinafter with reference to the drawings.

The operation formula of $T_{CB} = AT_P - B$ as shown in FIG. 2 uses a straight-line system for simplification of the operation, in which the A is a constant corresponding to the gain of a normal system and the B is a constant which can make fine adjustments of the speed; the values of A and B are determined by taking the safety and response of the system into consideration.

Referring to FIG. 2, the measured period $T_P$ after the frequency division of the pulse signal FG is first measured and is substituted into the operation formula. The clutch coil, if the operation results are positive, or the brake coil, if they are negative, is excited for a period after the frequency division of the following pulse signal FG only for the time of the operation results. Namely, when the measured period $T_P$ has been varied in a smaller direction, i.e., when the sewing machine has been varied onto a high-speed side, the on time duty cycle of the clutch is reduced. As the case may be (if a value of $T_{P2}$ or lower occurs), the brake is thrown and operates to prevent the speed from being made higher. When the measured period $T_P$ has been varied in a larger direction, i.e., when the sewing machine has been varied onto a low-speed side, the on time duty cycle of the clutch is increased. The controlling operation is performed so as to prevent the speed from becoming lower. A safety operation is effected at a point d (measured period $T_{P1}$, clutch-on time $T_{C1}$) just matched to the machine load in this manner.

The above-described condition is shown in FIG. 3. Referring to FIG. 3, the stable operating condition at a low speed $N_P$ is shown. A safe operation is effected at such a duty cycle as the clutch coil exciting signal CL may be outputted by $T_{C1}$ to the period $T_{P1}$ of the pulse signal FG.

When the pulse signal FG has been divided in frequency within the microcomputer 3 as described hereinabove, the measured period $T_P$ rapidly increases and accordingly, the engagement ratio of the clutch increases to accelerate the sewing machine. Assuming that the machine load torque in the increased speed remains almost unchanged, then the last clutch on time duty cycle becomes the same as during the operation at the low speed $N_P$. The operation is effected at an approximation of the point d. Namely, assuming that the time of the frequency dividing operation is 1, then the operation is effected at a speed which is twice as fast as the low speed $N_P$.

The construction example of the ROM table for conversion to the speed setting signal S (frequency-division time value) from the set position signal $P_D$ is shown below.

TABLE I

| Set Position Signal $P_D$ | Speed Setting Signal S (frequency-division number value) |
|---|---|
| 0 | *(0) |
| 1 | |
| 2 | |
| 3 | 0 |
| 4 | |
| 5 | |
| 6 | 1 |
| 7 | |
| 8 | 2 |
| 9 | 3 |
| 10 | 4 |
| 11 | 6 |
| 12 | 8 |
| 13 | 10 |
| 14 | 13 |
| 15 | |

The speed setting signal (0) of the * mark in the table I shown above is required only during the shifting time from the driving operation to the stop condition. The 0, 1, 2 of the setting position signals $P_D$ corresponding to the * mark are distinguished as the stop instruction regions by a special program.

The relationship of the set position signal $P_D$ with respect to the machine speed in accordance with the speed setting signal S converted as shown in the table shown above is shown as a graph in FIG. 4.

The machine speed $N_M$ shown here is represented in the following formula in accordance with the above-described principle.

$$N_M = N_P \times (S+1) \quad (1)$$

Figure 4:
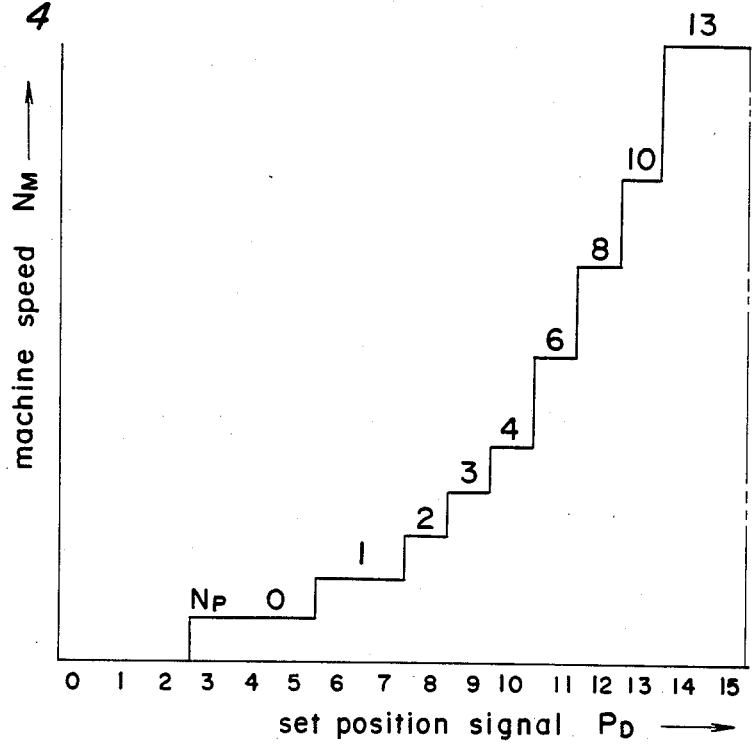
FIG. 4 is a chart for illustrating the sewing machine speed with respect to the pedal position.

Referring to FIG. 4, in the above-described control, the one stage portion of the reference speed $N_P$ suddenly changes at the machine speed, particularly in the 3 or higher region, i.e., the driving instruction region, of the set position signal $P_D$, for example, in the boundary between 5 and 6, or 7 and 8. If the pedal is positioned to become the boundary, large speed variations of the reference speed $N_P$ are caused by the vibration of the machine or by a slight change in the power-supply voltage. The embodiment wherein measures are taken against the speed variation by the use of a timer, which is one of the characteristics of the present invention will be shown in the flow chart of FIG. 5.

Figure 5:
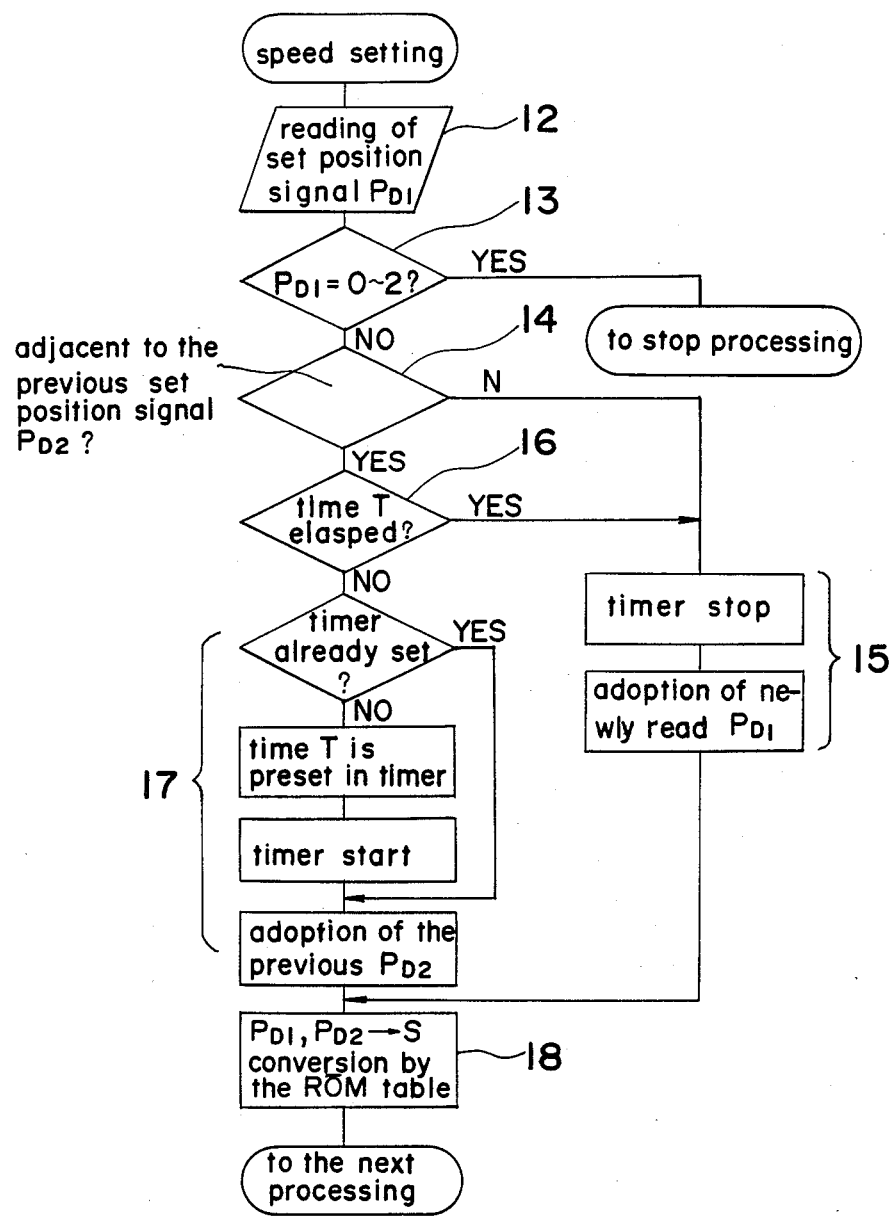
FIG. 5 is a flow chart showing the speed setting of the present invention.

Referring to FIG. 5, the set position signal $P_{D1}$ is newly read at the 12, the check is made as to whether it stays within the stop instruction range of 0 through 2 at 13, and it goes to a stop processing routine when it stays within the stop instruction range. If it does not stay within the stop instruction range, the driving condition of the machine continues. Then, at 14, it is compared with a previously read set position signal $P_{D2}$. If it is not an adjacent value or when time passes by "T" if it is an adjacent value, the timer stops at the 15 and set newly read position signal $P_{D1}$ is adopted. If this is not the case, a time "T" is preset in the timer at 17 to start the timer so as to thereby adopt the set position signal $P_{D2}$. After the above-described timer has been started, it is preset by a special timer-interrupt processing routine (not shown). When it has been started, it is always clocking.

At 18, it is converted from the set position signal $P_{D1}$ or $P_{D2}$ adopted as described hereinabove into the speed setting signal S by the ROM table and moves to the following processing.

The processing shown in the flow chart is inserted into one portion of the control processing loop during the machine driving operation. Accordingly, when the newly read set position signal $P_{D1}$ is a value adjacent to the conventional set position signal $P_{D2}$, the condition is not rendered effective until the condition continues for at least a time T.

In the setting of the time T, the reply to the motion to the respective adjacent pedal positions is delayed when too long a time is set. It is considered easy to set a time T which is not subject to the influences caused by vibration in the normal machine operation or by changes in the instantaneous analog signal $P_A$ through the power-supply variations, and which is independent of the reply delay. Also, in the normal sewing operation, it is ordinary that the operation wherein the value of the set position signal $P_D$ considerably changes is effected, especially in the sewing operation demanding the response property. The time T is neglected in such a case as described hereinabove and the ready answer can be given. It is considered that the time T can be set to a sufficiently long time.

The above-description is given about a case where the pedal is used as an adjusting means for setting the machine speed. The present invention is effective even where a variable volume for restricting the highest speed of the machine is used as the adjusting means, and the set position signal is provided through the A/D conversion, or where the set position signal is adapted to be made directly by a code switch.

Figure 6:
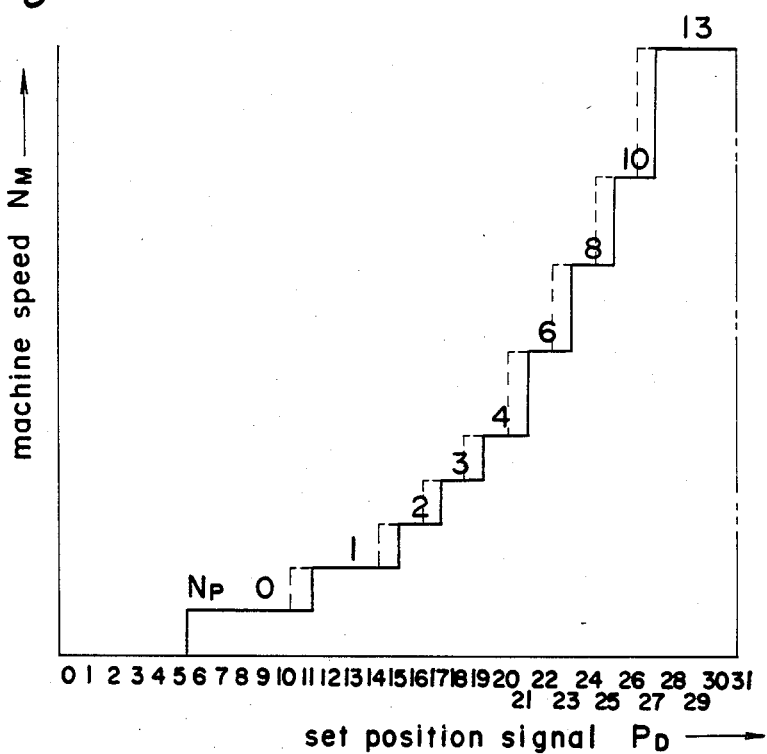
FIG. 6 is a chart for illustrating the sewing machine speed with respect to the pedal position in the other embodiment of the present invention.

Then, the second embodiment of the present invention will be described hereinafter with reference to FIG. 6 and FIG. 7. The ROM table for conversion to the speed setting S (frequency-division number value) from the set position signal $P_D$ is in two types as shown in Table II and Table III. The relationship of the machine speed with respect to the set position signal $P_D$ will be described as graph in FIG. 6. Referring to FIG. 6, the solid line is shown in accordance with the ROM table 1, while the broken line is shown in accordance with the ROM table 2.

TABLE II

| Set Position Signal $P_D$ | (ROM Table 1) Speed Setting Signal S (Frequency-Division Number Value) |
|---|---|
| 0 | *(0) |
| 1 | |
| 2 | |
| 3 | |
| 4 | |
| 5 | |
| 6 | 0 |
| 7 | |
| 8 | |
| 9 | |
| 10 | |
| **11 | |
| 12 | 1 |
| 13 | |
| 14 | |
| **15 | |
| 16 | 2 |
| **17 | |
| 18 | 3 |
| **19 | |
| 20 | 4 |
| **21 | |
| 22 | 6 |
| **23 | |
| 24 | 8 |
| **25 | |
| 26 | 10 |
| **27 | |
| 28 | 13 |
| 29 | |
| 30 | |
| 31 | |

TABLE III

| Set Position Signal $P_D$ | (ROM Table 2) Speed Setting Signal S (Frequency-Division Number Value) |
|---|---|
| 0 | *(0) |
| 1 | |
| 2 | |
| 3 | |
| 4 | |
| 5 | |
| 6 | 0 |
| 7 | |
| 8 | |
| 9 | |
| 10 | |
| **11 | 1 |
| 12 | |
| 13 | |
| 14 | |

TABLE III-continued (ROM Table 2)

| Set Position Signal $P_D$ | Speed Setting Signal S (Frequency-Division Number Value) |
|---|---|
| **15 | 2 |
| 16 | |
| **17 | 3 |
| 18 | |
| **19 | 4 |
| 20 | |
| **21 | 6 |
| 22 | |
| **23 | 8 |
| 24 | |
| **25 | 10 |
| 26 | |
| **27 | 13 |
| 28 | |
| 29 | |
| 30 | |
| 31 | |

Two types of ROM tables 1 and 2 are different only in the portion marked with **, i.e., the portion where the speed setting signal S is switched. The speed setting speed signal (0) of the * mark in the same table is necessary only at the motion from the driving condition to the stop condition. The 0 through 5 region of the set position signal $P_D$ corresponding to the * mark is distinguished as a stop instruction region in accordance with a special program.

Figure 7:
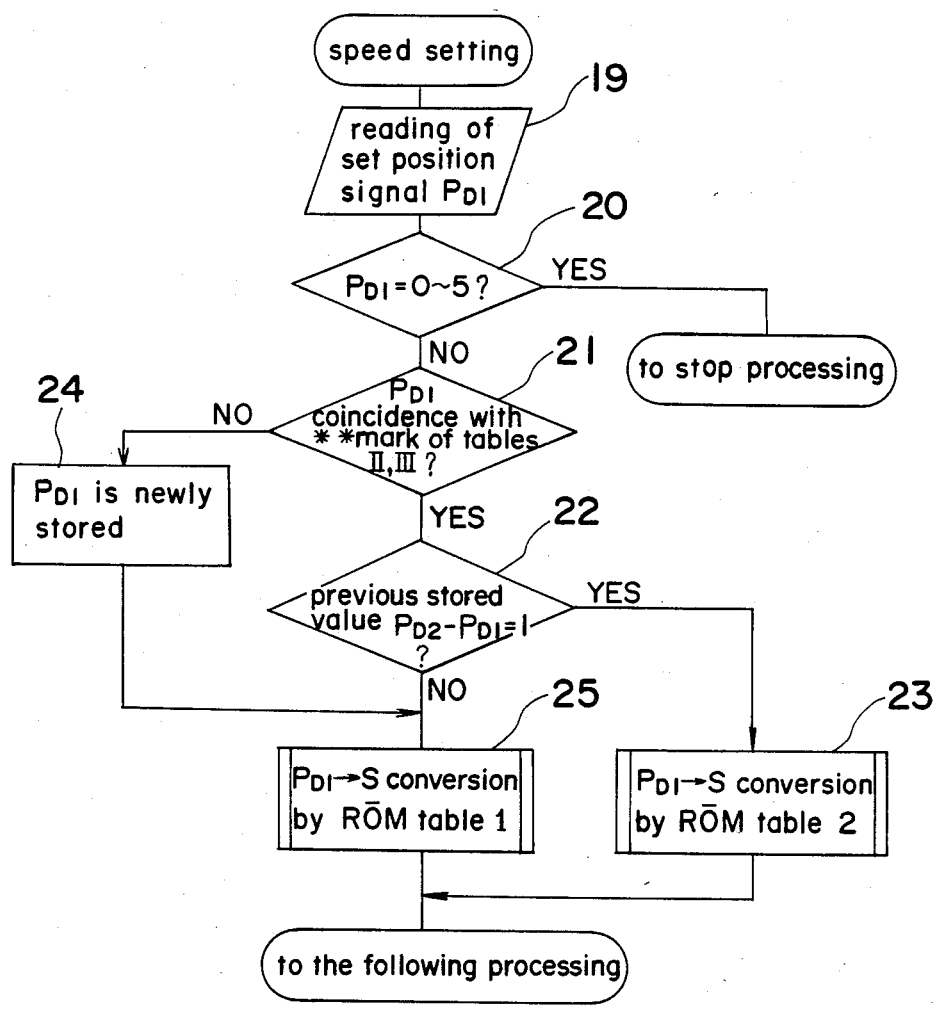
FIG. 7 is a flow chart showing the same-speed setting.

The selecting means of two ROM tables are shown in the flow chart of FIG. 7. The operation will be described hereinafter in accordance with the same drawing.

At first, at 19, the set position signal $P_{D1}$ is newly read, and a check is made as to whether the $P_{D1}$ stays within the stop instruction range at 20, it goes to a stop processing routine if it stays within the range; the driving condition of the machine will continue if it does not stay within the stop instruction range. Then, at 21, the check is made as to whether or not the newly read set position signal $P_{D1}$ is equal to a value shown with a  mark in Table II and Table III. If so, a check is made as to whether or not the value is smaller by 1 than the $P_{D2}$ previously read at 22. If so, it is converted to the speed setting signal S by the ROM Table 2 at the 23. Also, when it was any value except for a value shown with the mark  at 21, the conventionally stored data of $P_{D2}$ is newly set in the $P_{D1}$ at the 24. It is converted into the speed setting signal S by the ROM table 1 at 25, and the program moves to the following processing.

The processing shown in the flow chart of FIG. 7 is inserted into one portion of the control processing loop during the machine driving operation. To make the operation short, the ROM Table 2 is adopted only when the newly read set position signal $P_{D1}$ is smaller by 1 than the conventional set position signal $P_{D2}$ and is in the switching portion (the value of the ** mark of Table 1 or Table 2) of the speed signal, to provide the broken line of the machine speed of FIG. 6. With the exception of the above description, the ROM table 1 is adapted to provide the solid line machine speed of FIG. 6.

Under such a construction as described hereinabove, the set position signal portion, shown with the  mark, or the switching portion of the machine speed effects its hysteresis operation. Accordingly, when the range of the analog signal $P_A$ corresponding to the value of the  mark is kept sufficiently large, the machine speed can be independent of the vibrations of the machine.

The above-description is given about a case wherein the pedal is used as the adjusting means for setting the machine speed. The present invention is effective when the variable volume for restricting the maximum speed of the machine is used as the adjusting means, and the set position signal is provided through the A/D conversion, or even when the set position signal is adapted to be provided directly by a cord switch.

As apparent from the above-description, the present invention provides a sewing machine controlling apparatus, which is independent, in machine speed, of the influences which are caused by changes in the pedal position signal $P_A$ through the vibrations of the machine or the variations in the power-supply voltage. The smooth speed switching operation, which is free from the speed variation, can be realized even in the stepped switching point of the machine speed, thus resulting in greater advantages.

Although the present invention has been described in connection with the preferred embodiments thereof with reference to the accompanying drawings, it is to be noted that various changes and modification are apparent to those skilled in the art. Such changes and modifications are to be understood as included within the scope of this invention unless they depart therefrom.

What is claimed is:

1. A sewing machine controlling apparatus, comprising an adjusting means for setting a machine speed, a set position detecting means for converting the position of said adjusting means into a set position signal $P_D$ having a digital value, a speed converting means for converting said set position signal $P_D$ into a speed setting signal S, a motor whose speed in controlled in a step by step fashion in accordance with said speed setting signal S, a sewing machine to be mechanically driven by said motor, a controlling means for controlling the machine, a storage means for storing said set position signal $P_D$ wherein, when specific values of said set position signal corresponding to positions which are adjacent to one another are $P_{D1}$, $P_{D2}$, and $P_{D3}$ and specific values $S_1$ and $S_3$ of said speed setting signal correspond to said set position signal $P_{D1}$ and $P_{D3}$ and are respectively different from each other, said speed converting means respectively changes said set position signal value $P_{D2}$ to said speed setting signal value $S_1$, said speed setting signal value $S_3$ and either one of said speed setting signal values $S_1$ and $S_3$ when the value of said set position signal $P_D$ stored in said storage means is respectively either said set position signal value $P_{D1}$ or said set position signal value $P_{D3}$ or a set position signal value other than said set position signal values $P_{D1}$ and $P_{D3}$.

2. A sewing machine controlling apparatus in accordance with claim 1, wherein said speed setting signal value $S_2$ is changed to value $S_1$ when the content of said storing means is value $S_1$, and is changed to value $S_3$ when said content is value $S_3$, and is changed to either value $S_1$ or value $S_3$ when said content is not value $S_1$ or $S_3$.

* * * * *